(12) United States Patent
Dong et al.

(10) Patent No.: US 9,240,716 B2
(45) Date of Patent: Jan. 19, 2016

(54) SWITCHING POWER SUPPLY CIRCUIT

(71) Applicant: ASUSTeK COMPUTER INC., Taipei (TW)

(72) Inventors: Zhao-Long Dong, Taipei (TW); Ching-Ji Liang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 107 days.

(21) Appl. No.: 14/161,701

(22) Filed: Jan. 23, 2014

(65) Prior Publication Data

US 2014/0225584 A1    Aug. 14, 2014

(30) Foreign Application Priority Data

Feb. 8, 2013   (CN) .......................... 2013 1 0050140

(51) Int. Cl.
- G05F 1/00   (2006.01)
- H02M 3/156   (2006.01)
- H02M 1/32   (2007.01)
- H02M 1/00   (2007.01)

(52) U.S. Cl.
CPC ................ H02M 3/156 (2013.01); *H02M 1/32* (2013.01); *H02M 2001/0025* (2013.01)

(58) Field of Classification Search
CPC ....... H02M 3/157; H02M 3/156; H02M 1/32; H02M 2001/0025

USPC .......................................... 323/282, 284–285
See application file for complete search history.

(56) References Cited

U.S. PATENT DOCUMENTS

| | | | |
|---|---|---|---|
| 6,356,063 B1* | 3/2002 | Brooks ......................... | 323/284 |
| 7,135,841 B1* | 11/2006 | Tomiyoshi et al. ........... | 323/268 |
| 2002/0057069 A1 | 5/2002 | Kushida | |
| 2005/0134243 A1 | 6/2005 | Weiner | |
| 2009/0153114 A1* | 6/2009 | Huang .......................... | 323/282 |
| 2010/0102788 A1* | 4/2010 | Kuroyabu et al. ............ | 323/282 |
| 2010/0301827 A1* | 12/2010 | Chen et al. .................... | 323/299 |
| 2012/0025792 A1* | 2/2012 | Lipcsei et al. ................ | 323/271 |
| 2012/0212195 A1* | 8/2012 | Kushida et al. ............... | 323/271 |

FOREIGN PATENT DOCUMENTS

CN             1862931 A      11/2006

* cited by examiner

*Primary Examiner* — Jue Zhang
(74) *Attorney, Agent, or Firm* — CKC & Partners Co., Ltd.

(57) ABSTRACT

A switching power supply circuit is disclosed in an embodiment. The switching power supply circuit includes a power output stage, a pulse width modulation (PWM) signal generator, a compensation module, and a overshooting protection module. The power output stage is used for generating an output signal to drive a load device. The PWM signal generator generates a pulse width modulation (PWM) signal which is used for controlling the power output stage. The compensation module is used for generating a compensation signal to the PWM signal generator according to the output signal. The overshooting protection module receives the output signal to enable or disable the PWM signal generator.

6 Claims, 6 Drawing Sheets

SWITCHING POWER SUPPLY CIRCUIT

CROSS-REFERENCE TO RELATED APPLICATION

This application claims the priority benefit of China application serial No. 201310050140.5, filed on Feb. 8, 2013. The entirety of the above-mentioned patent application is hereby incorporated by reference herein and made a part of specification.

BACKGROUND OF THE INVENTION

1. Field of the Invention

The disclosure relates to a switching power supply circuit and, more particularly, to a switching power supply circuit with an overshooting protecting function.

2. Description of the Related Art

A switching power supply is a common power supply circuits, and it is usually used in a microprocessing system and a computer system. The switching power supply adjusts an input voltage to a required output voltage.

However, a load may change along with time or different situations in practical operation. For example, when a load device (such as a microprocessor) executes a specific task (such as an operation task) may need a higher driving power, that is to say, the load increases; after the specific task is finished, the load may sharply decrease.

When the load of a load device rapidly decreases, a resistance of the load is rapidly changed, an instantaneous voltage of an output voltage may exceed a maximum allowable voltage of the circuit, which is the transient overshooting and may cause the power supply circuit unstable.

BRIEF SUMMARY OF THE INVENTION

A switching power supply circuit is provided. The switching power supply circuit includes a power output stage, a pulse width modulation (PWM) signal generator, a compensation module, and an overshooting protection module. The power output stage is used for generating an output signal to drive a load device. The PWM signal generator generates a pulse width modulation (PWM) signal which is used for controlling the power output stage. The compensation module is used for generating a compensation signal to the PWM signal generator according to the output signal. The overshooting protection module receives the output signal to enable or disable the PWM signal generator.

According to an embodiment of the disclosure, the overshooting protection module includes a switching unit and an overshooting detecting unit. The switching unit is coupled with the PWM signal generator and used for enabling or disabling the PWM signal generator. The overshooting detecting unit is used for detecting whether the output signal exceeds a threshold voltage to generate a detecting result and driving the switching unit to enable or disable the PWM signal generator according to the detecting result.

The switching power supply circuit includes the overshooting protection module which can keep the PWM signal at a low level to stop charging the output signal, so as to make the output signal stop sharply increasing. Consequently, it can avoid that the output signal overshoots and exceeds a maximum allowable voltage, which can make the power supply circuit much more stable.

These and other features, aspects and advantages of the present disclosure will become better understood with regard to the following description, appended claims, and accompanying drawings.

DETAILED DESCRIPTION OF THE EMBODIMENTS

Figure 1:
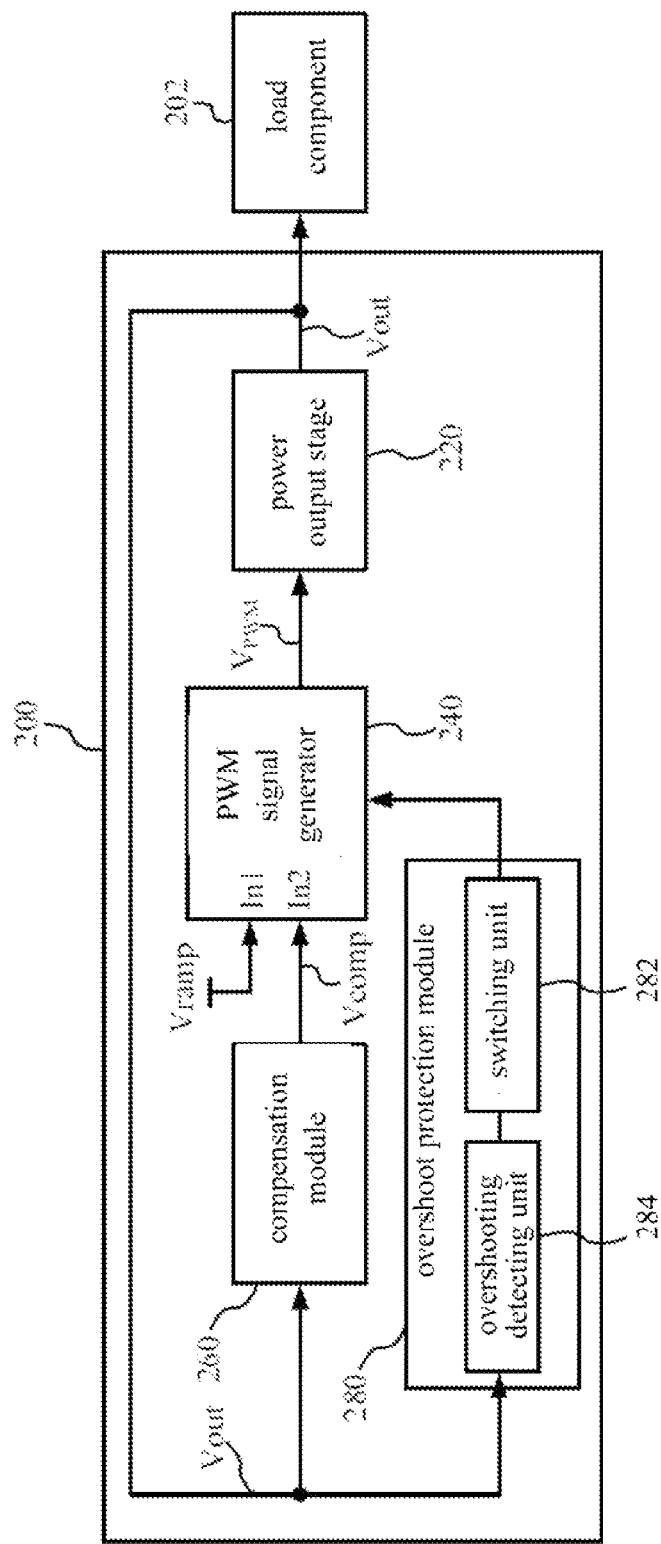
FIG. 1 is a functional block diagram of a switching power supply circuit in an embodiment.

Please refer to FIG. 1, which is a functional block diagram of a switching power supply circuit in an embodiment. The switching power supply circuit 200 includes a power output stage 220, a pulse width modulation (PWM) signal generator 240, a compensation module 260, and an overshooting protection module 280. The switching power supply circuit 200 may be a switching-mode buck power converter. The power output stage 220 is used for generating an output signal Vout (such as an output voltage) to drive a load device 202.

The PWM signal generator 240 generates a pulse width modulation (PWM) signal $V_{PWM}$ for controlling a power transistor of the power output stage 220 on or off.

The PWM signal generator 240 includes a first input terminal IN1 and a second input terminal IN2. The first input terminal IN1 receives a periodic pulse Vramp. The periodic pulse Vramp may be a periodic triangular pulse used as a reference voltage.

The PWM signal generator 240 compares a voltage of the second input terminal IN2 and the periodic pulse Vramp to generate the PWM signal $V_{PWM}$.

The compensation module 260 is used for generating a compensation signal Vcomp to the PWM signal generator 240 according to the output signal Vout. The compensation module 260 may include a liner compensator which may sample and liner regulate the output signal Vout (for example, copy the output signal Vout, mirror the output signal Vout, scaled regulate the output signal Vout, and/or superpose a bias voltage on the output signal Vout) to generate the compensation signal Vcomp.

In a normal operation process, the compensation module 260 transmits the compensation signal Vcomp to the second input terminal IN2 of the PWM signal generator 240. The PWM signal generator 240 compares the voltage of the first input terminal IN1 and the voltage of the second input terminal IN2.

The overshooting protection module 280 includes a switching unit 282 and an overshooting detecting unit 284. The switching unit 282 is coupled with the PWM signal generator 240 and used for selectively enabling or disabling the PWM signal generator 240 to generate the PWM signal $V_{PWM}$.

Figure 2:
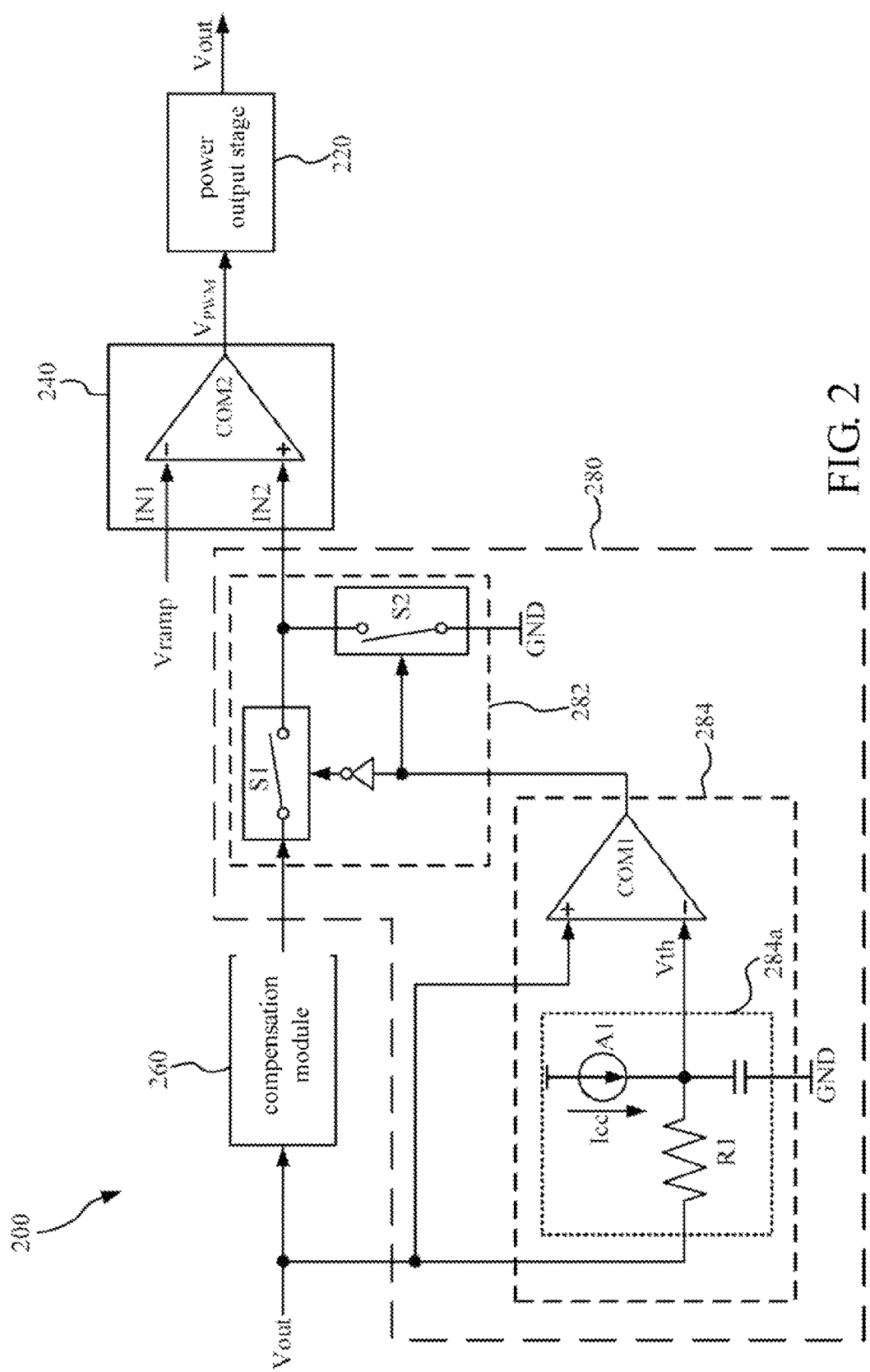
FIG. 2 is a circuit schematic diagram of the switching power supply circuit in FIG. 1.

Please further refer to FIG. 2 which is a circuit schematic diagram of the switching power supply circuit in FIG. 1.

The overshooting detecting unit 284 includes a threshold voltage generator 284a and a comparator COM1. The threshold voltage generator 284a is used for generating a threshold voltage Vth. The comparator COM1 includes a non-inverting input terminal (+) and an inverting input terminal (−). The non-inverting input terminal of the comparator COM1 receives the output signal Vout, and the inverting input terminal of the comparator COM1 is coupled with the threshold voltage generator 284a to receive the threshold voltage Vth.

The comparator COM1 of the overshooting detecting unit 284 is used for comparing a transient voltage of the output signal Vout and the threshold voltage, so as to determine whether the output signal Vout needs the overshooting protection accordingly. When the transient voltage of the output signal Vout does not reach the threshold voltage, the switching unit 282 enables the PWM signal generator 240 to generate the PWM signal $V_{PWM}$; otherwise, when the transient voltage of the output signal Vout exceeds the threshold voltage, the switching unit 282 disables the PWM signal generator 240.

In the embodiment, the PWM signal generator 240 includes a comparator COM2. The non-inverting input terminal of the comparator COM2 is connected with the second input terminal IN2, and the inverting input terminal of the comparator COM2 is connected with the first input terminal IN1.

The switching unit 282 is coupled with the second input terminal IN2, the compensation module 260, and a ground GND. The switching unit 282 is used for selectively coupling the second input terminal IN2 with the compensation module 260 or the around GND. In the embodiment, the switching unit 282 includes a first switch S1 and a second switch S2. The first switch S1 is coupled between the second input terminal IN2 and the compensation module 260. The second switch S2 is coupled between the second input terminal IN2 and the ground GND. The first switch S1 and the second switch S2 is mutually exclusive turned on or off.

Figure 3:
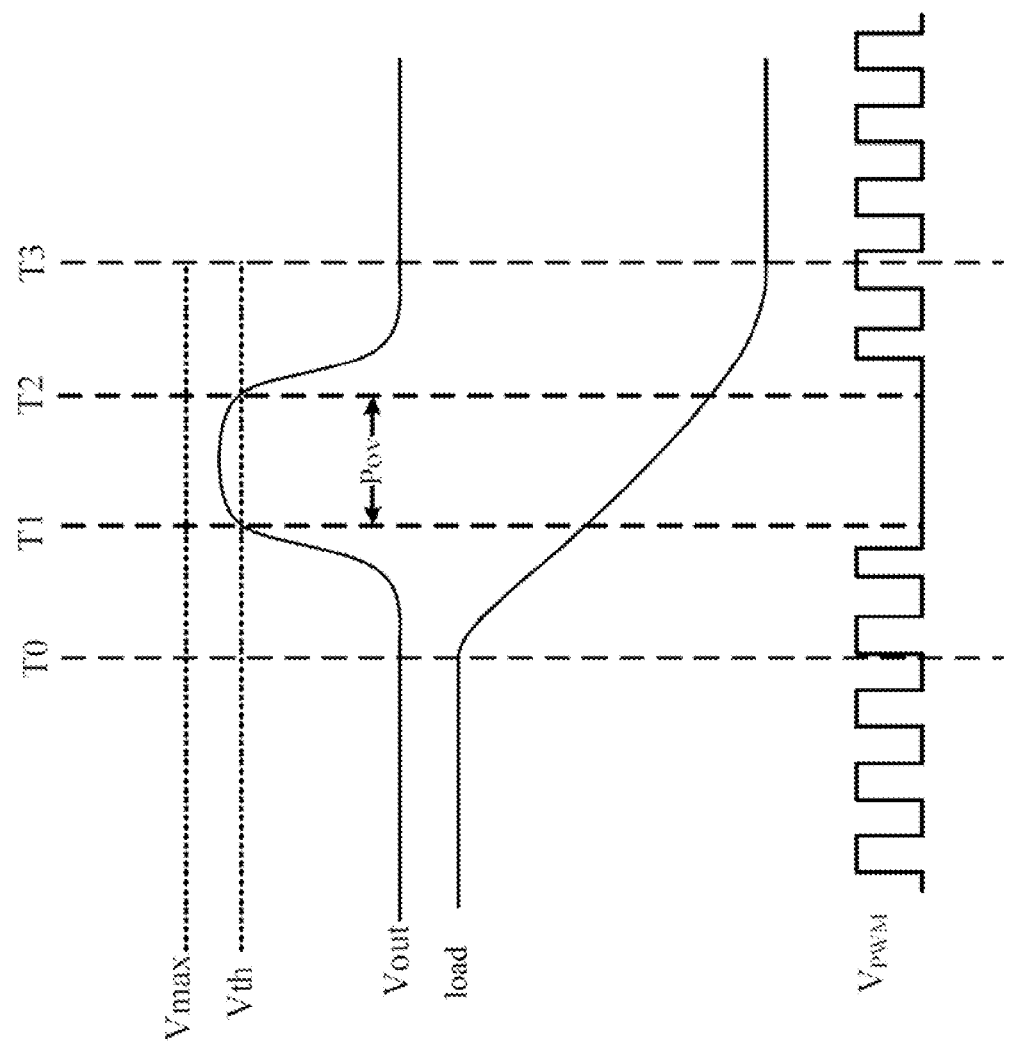
FIG. 3 is a signal schematic diagram at a time that a load device is suddenly decreased from the switching power supply circuit in FIG. 1.

Please further refer to FIG. 3, which is a signal schematic diagram when a load of a load device is suddenly decreased from the switching power supply circuit in FIG. 1. A load sharply decreases from a time point T0 to a time point T3.

When the transient voltage of the output signal Vout does not reach the threshold voltage (that is to say, the overshooting detecting unit 284 determines that the output signal Vout normally operates), the first switch S1 is turned on and the second switch S2 is turned off from a time point T0 to a time point T1 and from a time point T2 to a time point T3, and the PWM signal $V_{PWM}$ is switched between a high voltage and a low voltage.

From the time point T0 to the time point T1, the compensation module 260 may gradually decrease a cycle of the PWM signal $V_{PWM}$ according to the variation of load. If the load is changed sharply and makes the output signal Vout sharply increase, the overshooting protection module 280 starts an overshooting protection process.

For example, in a overshooting protection interval Pov between the time point T1 and the time point T2, the transient voltage of the output signal Vout exceeds the threshold voltage Vth (that is to say, the overshooting detecting unit 284 determines that the output signal Vout needs the overshooting protection), the second switch S2 is turned on and the first switch S1 is turned off, therefore, the second input terminal IN2 of the PWM signal generator 240 (the non-inverting input terminal of the comparator COM2) is connected to ground, so the output signal generated by the comparator COM2 is pulled down to a low level (at the time, in the overshooting protection interval Pov, the PWM signal $V_{PWM}$ stops changing periodically and keeps at a low level.).

The threshold voltage Vth is lower than a maximum allowable voltage of a circuit system or the load device. The threshold voltage Vth may be set as an appropriate proportion (such as 70%) of the maximum allowable voltage Vmax.

Consequently, if the transient voltage of the output signal Vout exceeds the threshold voltage Vth, the PWM signal $V_{PWM}$ is kept at the low level, and then the output signal Vout would not sharply increase, therefore, it can avoid that the output signal Vout overshoots and exceeds the maximum allowable voltage Vmax.

Additionally, in the embodiment in FIG. 2, the threshold voltage generator 284a for generating the threshold voltage Vth includes a capacitor C1, a resistor R1, and a constant current source A1.

As showed in FIG. 2, the capacitor C1 is coupled between the inverting input terminal of the comparator COM1 and the ground GND. A first end of the resistor R1 receives the output signal Vout, and a second end of the resistor R1 is coupled with the inverting input terminal of the comparator COM1. The constant current source A1 is coupled with the second end of the resistor R1 and generates a constant current Icc which passes the resistor R1 to generate a potential difference.

In the embodiment in FIG. 2, the value of the threshold voltage Vth generated by the threshold voltage generator 284a matches the following formula: Vth=$Vout_s$+Icc×R1, wherein, $Vout_s$ is a steady state potential of the output signal Vout, and Icc×R1 is the potential difference which is generated while the constant current Icc passes the resistor R1.

The threshold voltage Vth is automatically changed along with the steady state potential $Vout_s$ of the output signal Vout. For example, the threshold voltage Vth is set as the sum value of the steady state potential of the output signal Vout and a threshold bias 2V, wherein the threshold bias 2V may be adjusted by a current value of the constant current Icc and a resistance value of the resistor R1. For example, when the steady state potential of the output signal Vout is 5V, the threshold voltage Vth generated by the threshold voltage generator 284a is 7V; when the steady state potential of the output signal Vout is 9V, the threshold voltage Vth generated by the threshold voltage generator 284a is 11V.

Figure 4:
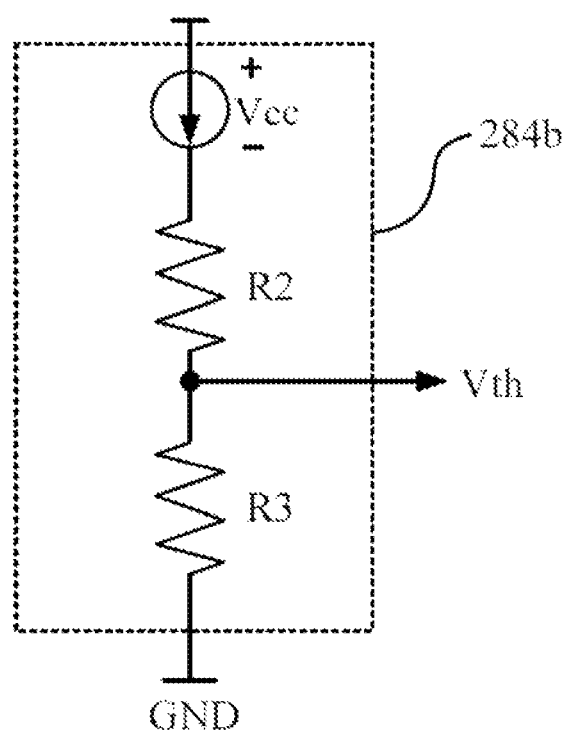
FIG. 4 is a schematic diagram of a threshold voltage generator according to another embodiment.
Figure 5:
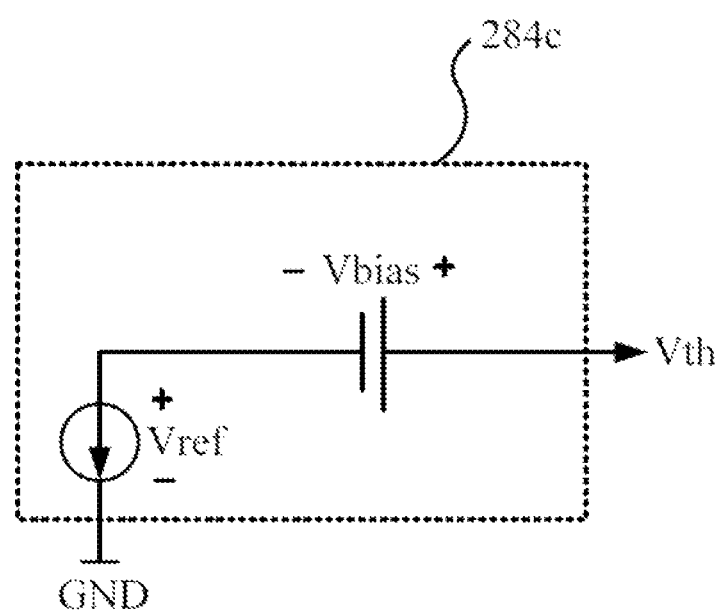
FIG. 5 is a schematic diagram of a threshold voltage generator according to further another embodiment.

The threshold voltage generator 284a is not limited in the embodiment of FIG. 2. Please refer to FIG. 4 and FIG. 5. FIG. 4 is a schematic diagram of a threshold voltage generator 284b according to another embodiment; FIG. 5 is a schematic diagram of a threshold voltage generator 284c according to further another embodiment.

As showed in FIG. 4, the threshold voltage generator 284b may include a voltage division circuit (the voltage division circuit includes a resistor R2 and a resistor R3), the voltage division circuit generates the threshold voltage Vth according to a voltage division result of the constant voltage source Vcc.

In an embodiment in FIG. 4, the value of the threshold voltage Vth generated by the threshold voltage generator 284b matches the following formula:

$$Vth = Vcc \times \frac{R3}{R2 + R3}.$$

In the embodiment in FIG. 4, the threshold voltage Vth may be adjusted by adjusting a proportion of the resistor R2 and the resistor R3.

As shown in FIG. 5, the threshold voltage generator 284c may include a bias voltage superposition circuit, the bias voltage superposition circuit generates the threshold voltage Vth according to a result that constant voltage Vref of the constant voltage source superposes a bias voltage Bias.

In an embodiment in FIG. 5, the value of the threshold voltage Vth generated by the threshold voltage generator 284b matches the following formula: Vth=Vref+Vbias.

In the embodiment of FIG. 5, the threshold voltage Vth may be adjusted by a value of the bias voltage.

Furthermore, an operation and a connection way of the switching unit are not limited in these showed in FIG. 2. Please further refer to FIG. 6, which is a circuit diagram of a switching power supply circuit according to another embodiment.

Figure 6:
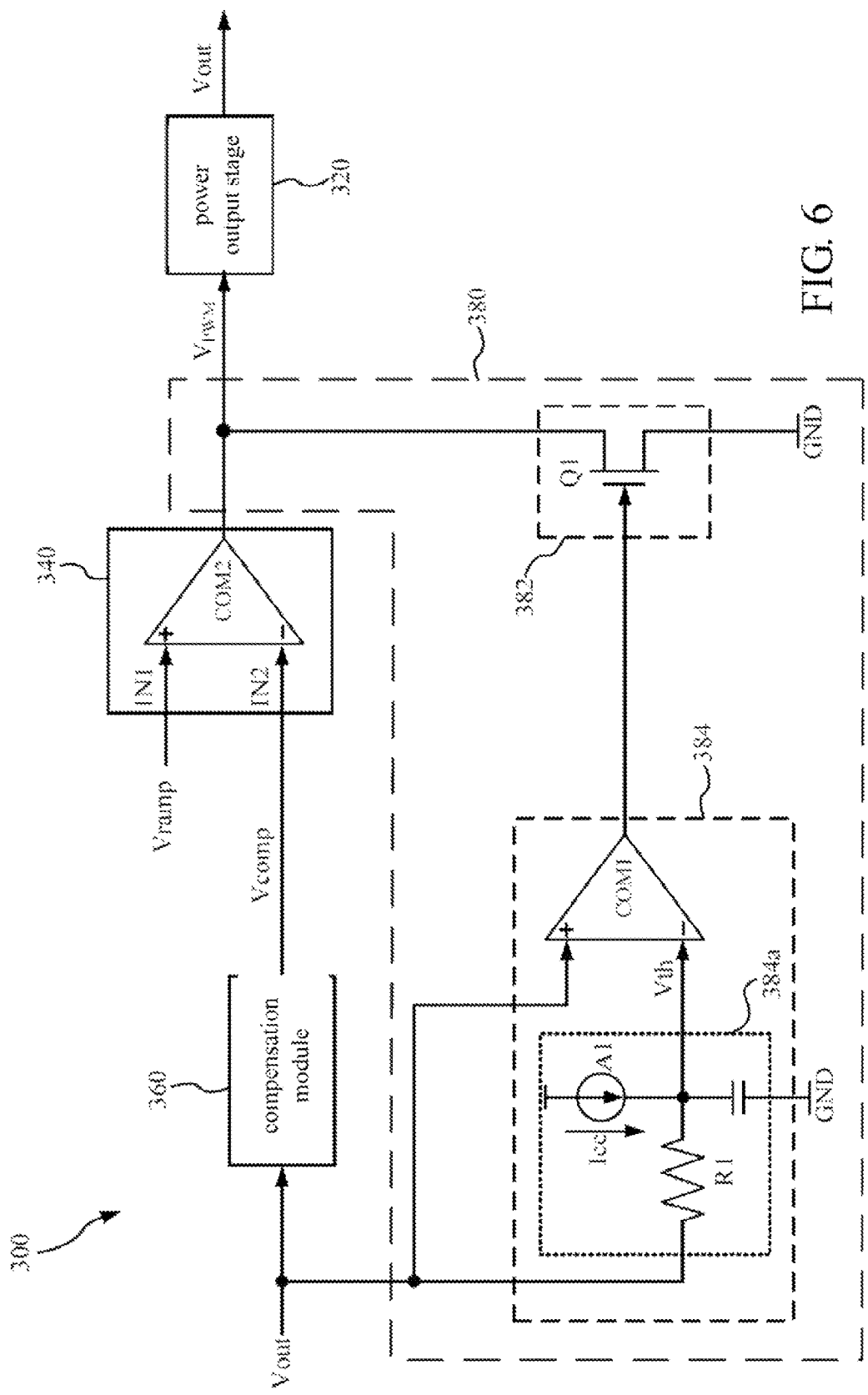
FIG. 6 is a circuit diagram of a switching power supply circuit according to another embodiment.

As showed in FIG. 6, the switching power supply circuit 300 includes a power output stage 320, a PWM signal generator 340, a compensation module 360, and an overshooting protection module 380. The overshooting protection module 380 includes a switching unit 382 and an overshooting detecting unit 384. In an embodiment of FIG. 6, the switching unit 382 includes a switching transistor Q1 coupled between the ground GND and an output end of the PWM signal generator 340.

The switching transistor Q1 of the switching unit 382 is used for selectively coupling the output end of the PWM signal generator 340 with the power output stage 320 or the ground GND.

When the transient voltage of the output signal Vout does not reach the threshold voltage, the switching transistor Q1 is turned off, and the PWM signal $V_{PWM}$ generated by the PWM signal generator 340 is normally transmitted to the power output stage 320.

When the transient voltage of the output signal Vout exceeds the threshold voltage Vth, the switching transistor Q1 is turned on, and the output end of the PWM signal generator 340 is connected to ground, that is to say, an input signal of the power output stage 320 is pulled down to a low level. Since the switching transistor Q1 is turned on, the PWM signal $V_{PWM}$ cannot be transmitted to the power output stage 320, which is disabling the PWM signal generator 340 to generate the PWM signal $V_{PWM}$ (at this time, the PWM signal $V_{PWM}$ stops changing periodically and keeps at a low level.).

Furthermore, the operation of other components of the switching power supply circuit 300 in FIG. 6 is the same as that is in other embodiments, which is omitted herein.

In sum up, according to a switching power supply circuit with the overshooting protection module in embodiments, if the transient voltage of the output signal exceeds the threshold voltage, the overshooting protection module keeps the PWM signal at a low level, stops charging the output signal, so as to make the output signal not sharply increase anymore. Consequently, it can avoid that the output signal overshoots and exceeds the maximum allowable voltage. Furthermore, the threshold voltage may be automatically changed along with the steady state potential of the output signal.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A switching power supply circuit, comprising:
   a power output stage for generating an output signal to drive it load device;
   a pulse width modulation (PWM) signal generator electrically connected with the power output stage and generating a pulse width modulation (PWM) signal to control the power output stage;
   a compensation module electrically connected with the PWM signal generator for generating a compensation signal to the PWM signal generator according to the output signal; and
   an overshooting protection module electrically connected with the PWM signal generator and the compensation module, wherein the overshooting protection module receives the output signal to enable or disable the PWM signal generator, wherein the overshooting protection module comprises:
      a first switch coupled with the PWM signal generator and the compensation module;
      a second switch coupled with the PWM signal generator and a ground,
      wherein the first switch and the second switch are turned on or turned off according to whether the output signal exceeds the threshold voltage, and the first switch and the second switch are mutually exclusive turned on or off; and
         an overshooting detecting unit for detecting whether the output signal exceeds a threshold voltage to generate a detecting result and drive the first switch and the second switch to enable or disable the PWM signal generator according to the detecting result.

2. The switching power supply circuit according to claim 1, wherein the PWM signal generator includes a comparator, a terminal of the comparator receives a periodic pulse, and another terminal of the comparator receives the compensation signal.

3. The switching power supply circuit according to claim 1, wherein the overshooting detecting unit comprises:
   a threshold voltage generator for generating a threshold voltage;
   a comparator including an inverting input terminal and a non-inverting input terminal, wherein the non-inverting input terminal receives the output signal, and the inverting input terminal is coupled with the threshold voltage generator to receive the threshold voltage.

4. The switching power supply circuit according to claim 3, wherein the threshold voltage generator comprises:
   a capacitor coupled with the inverting input terminal;
   a resistor, wherein a first end of the resistor receives the output signal, and a second end of the resistor is coupled with the inverting input terminal; and
   a constant current source coupled with the second end of the resistor.

5. The switching power supply circuit according to claim 3, wherein the threshold voltage generator includes a bias voltage superposition circuit, the bias voltage superposition circuit generates the threshold voltage according to a result which is a constant voltage of the constant voltage source superposes a bias voltage.

6. The switching power supply circuit according to claim 3, wherein the threshold voltage generator includes a voltage division circuit, and the voltage division circuit generates the threshold voltage according to a dividing result of a constant voltage source.

* * * * *